(12) United States Patent
Massand (10) Patent No.: US 8,381,104 B2
(45) Date of Patent: Feb. 19, 2013

(54) SYSTEMS AND METHODS FOR PROVIDING CONTEXT RECOGNITION

(75) Inventor: Deepak Massand, McLeansville, NC (US)

(73) Assignee: Litera Technologies, LLC, McLeansville, NC (US)

( * ) Notice: Subject to any disclaimer, the term of this patent is extended or adjusted under 35 U.S.C. 154(b) by 302 days.

(21) Appl. No.: 12/862,308

(22) Filed: Aug. 24, 2010

(65) Prior Publication Data

US 2011/0276919 A1 Nov. 10, 2011

Related U.S. Application Data

(60) Provisional application No. 61/331,856, filed on May 6, 2010.

(51) Int. Cl.
*G06F 13/00* (2006.01)
*G06F 15/00* (2006.01)

(52) U.S. Cl. ........................... 715/713; 715/783

(58) Field of Classification Search .......... 715/745–747, 715/781, 784, 779, 841, 783, 840, 713
See application file for complete search history.

(56) References Cited

U.S. PATENT DOCUMENTS 5,990,905 A * 11/1999 Chew et al. .................. 345/630
7,870,566 B2 * 1/2011 Zhang et al. ................ 719/318

* cited by examiner

*Primary Examiner* — Cao "Kevin" Nguyen
(74) *Attorney, Agent, or Firm* — Finnegan, Henderson, Farabow, Garrett & Dunner, L.L.P.

(57) ABSTRACT

Systems and methods are disclosed for launching a child application to perform functions on a document created by a parent application without the need for integration of the child application within the parent application. In one implementation, a system detects a child application available for activation by a processor of a computer and determines what functions the child application can perform. The system then determines that the function can operate on an open file, and once the system receives a selection of the function, the system launches the child application and performs the function on the open file. In another implementation, the system determines that the function may operate on a plurality of open files, creates an interface that allows selection of one of the plurality of open files, and launches the child application and performs the function on a selected file.

26 Claims, 10 Drawing Sheets

SYSTEMS AND METHODS FOR PROVIDING CONTEXT RECOGNITION

RELATED APPLICATIONS

This application claims priority from U.S. Provisional Application Ser. No. 61/331,856, filed May 6, 2010, the disclosure of which is expressly incorporated herein by reference.

FIELD

This disclosure generally relates to the management and integration of software products and more particularly, to a method and system for managing child software applications that integrate with parent software applications.

BACKGROUND

For decades a number of software applications have become core products used by professionals to manage various business operations. For instance, word processing, spreadsheet, document processing, presentation, and drawing software applications, such as Microsoft® Word, EXCEL®, PowerPoint®, Visio®, PROJECT, and Adobe® Acrobat®, have become ubiquitous in business and personal computer usage. Users create, edit, and otherwise manage their documents and other files within these applications. Thus, it these types of software applications are referred to herein parent applications.

Since their inception, parent applications have steadily gained popularity and now have become the foundation for most business and personal computing environments. As a result, third party applications were developed and designed to integrate with parent applications to provide additional features that compliment those of the parent applications. These applications, referred to herein as child applications, obtained functionality through their integration within a parent application or through user navigation from the child application to a location of a saved file created and/or edited in a parent application.

The diversity and growth of child applications has resulted in a computer programming environment where parent applications include multiple child applications that have been integrated within the parent application and expand the capability of the parent application. When a child application is integrated with a parent application, the functionality offered by the child application becomes available from within the parent application. The parent application may make the child functionality available through, for example, a button on a toolbar or through a menu option.

Because, however, the child applications depend on services provided by the parent application and may not work by themselves, the child applications must load when the parent application loads. For example, a business user's word processing document might be associated with a number of child applications, and thus, for example, include in its toolbar additional buttons relating to the various functionalities of the child applications. These functionalities may include functionalities to (1) compare the document to another; (2) convert the document to PDF, (3) format tables of contents and numbering; (4) add document identification numbers; (5) manage references and other footnotes included in the document; (6) enable robust image editing; (7) collaborate with other users; (8) manage externally designed templates; (9) integrate with a document management system; (10) track, manage and clean metadata; (11) conduct and manage screenshots; and (12) incorporate contacts from a contact management system. In scenarios where these twelve functionalities need to run, one user of a single parent application requires a minimum of twelve integrations. In addition, a minimum of twelve additional functionality buttons must be added to the interface of the word processing program, thus crowding the field of the word processing's preexisting traditional functionality buttons.

Integrating child applications in a parent application is typically done using the native application programming interface (API) provided by parent applications, such as COM objects, ODMA integrations, command line integration, DLL integration, or other known methodologies. Unfortunately, these multiple integrations create a computing environment that hinders productivity and causes major delays in the loading of the parent application because all the integrated child applications' integrations must also be loaded.

Regardless of the method used to create the integrations, the child application's integration resides within the parent application. Each time a user starts the parent application, the integrations, or "add ins" as they are commonly called, have to load and start. In addition, each time a user closes the parent application the "add ins" have to unload and stop. Thus, the greater the number of integrations, the longer the time the parent application takes to open or close, creating a loss of productivity for the users. Additionally, the integrated child applications open the parent application up to a range of potential errors, bugs, and other technical issues and conflicts caused by multiple child applications seeking integration with the parent application.

However, without "add ins," accessing the functionality of a child application that is dependent upon a parent application requires multiple steps, leading to lost productivity. For example, a user wishing to compare two versions of the same PDF document, in a case where that comparison functionality is not integrated or "added in" as another functionality in the Word Processing software (e.g., Microsoft® WORD®), must first open the document comparison child application, then browse to and select the saved versions of the two files to compare and, finally, submit a request to process the comparison of those two files. Often the IT departments of company networks, frustrated by the problems and the consequential support burden created by "add ins," remove them. The "add in" removal makes the users' workflow somewhat less productive.

Currently, there are only two options for dealing with the management and integration of child applications with parent applications. Users may accept the loading and unloading problems related to integrating "add ins" or remove the "add-ins" and accept the loss of productivity. Both of these are not ideal options to increase the productivity and efficiency of computer users. As such, current systems implementing child and parent applications are dated and have reached their capacity to improve productivity related to functionality and workflow efficiency.

Therefore it is desirable to provide users with the functionality offered by child applications without the inherent problems related to the current integration of those functionalities. Thus, there is a need for a method and system of software coupling that does not require child applications to integrate with and be presented inside of parent applications or require users to navigate through multiple steps to enable a child application to use files created in a parent application. Methods and systems consistent with the disclosed embodiments of the invention address these and other problems of current child application integrations.

SUMMARY

Disclosed embodiments provide a context recognition and activation engine that allows a user to apply the functionality of one or more child applications to the subject matter of a parent application. For example, disclosed embodiments may give a user the ability to send a word processing document to one or more child applications, such as meta-data removal or document comparison applications, for processing.

Consistent with disclosed embodiments, a method is provided for launching a child application without integrating the child application into parent applications. In one aspect, the method includes detecting a child application available to a processor of a computer and determining a function that is associated with the child application. The method may further include determining one or more parameters used to perform the function of the child application and generating information used to display a representation of the function in an interface that is separate from a parent application, so that the function is selectable and launches the child application upon selection.

Consistent with other disclosed embodiments, a system is provided for launching a child application without integrating the child application into a parent application. In one aspect, the system includes a processor and a memory. The memory includes instructions that cause the processor to generate information used to display a representation of a plurality of functions available in a child application, so that the plurality of functions are selectable. The memory may further include instructions that cause the processor to recognize an open file created by the parent application. The memory further includes instructions that cause the processor to determine that one of the plurality of functions can be performed on the open file, to receive a selection of the representation of the one of the plurality of functions, and to launch the child application to perform the one of the plurality of functions on the open file.

Consistent with other disclosed embodiments, tangible computer-readable storage media may store program instructions that are executable by a processor to implement any of the methods, disclosed herein.

It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute a part of this specification, illustrate several embodiments and together with the description, serve to explain the disclosed principles. In the drawings.

DESCRIPTION OF THE EMBODIMENTS

Disclosed embodiments may enable a context recognition and activation engine to recognize opened files created from various parent applications. The activation engine may then make the functionality of child applications available to a user outside of a direct integration relationship with parent applications or the multi-step process of navigating to saved locations of those same files. Disclosed embodiments may accomplish this by, for example, creating an interface, or another parent application, that includes the API for various child programs. The interface is configured to recognize the functions that each child application can perform and the parent application files the functions can be performed on. In one embodiment, the context recognition and activation engine may communicate with an operating system to determine what files are open, what parent application opened them, and match this information with the child program APIs.

Reference will now be made in detail to exemplary embodiments, examples of which are illustrated in the accompanying drawings. Wherever convenient, the same reference numbers will be used throughout the drawings to refer to the same or like parts.

Figure 1A:
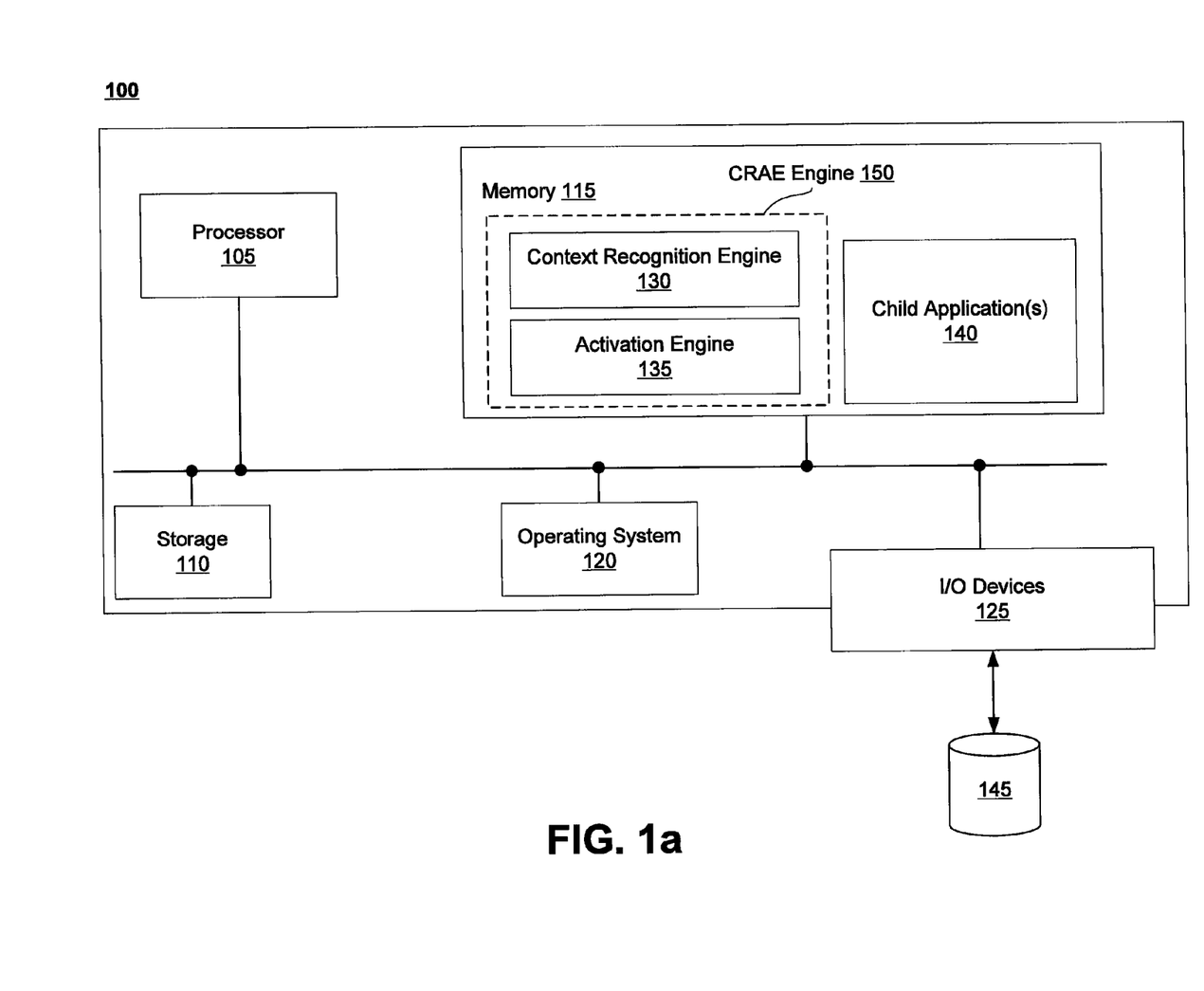
FIGS. 1a and 1b are diagrams of exemplary context recognition and activation system components that may be used to implement disclosed embodiments.
Figure 1B:
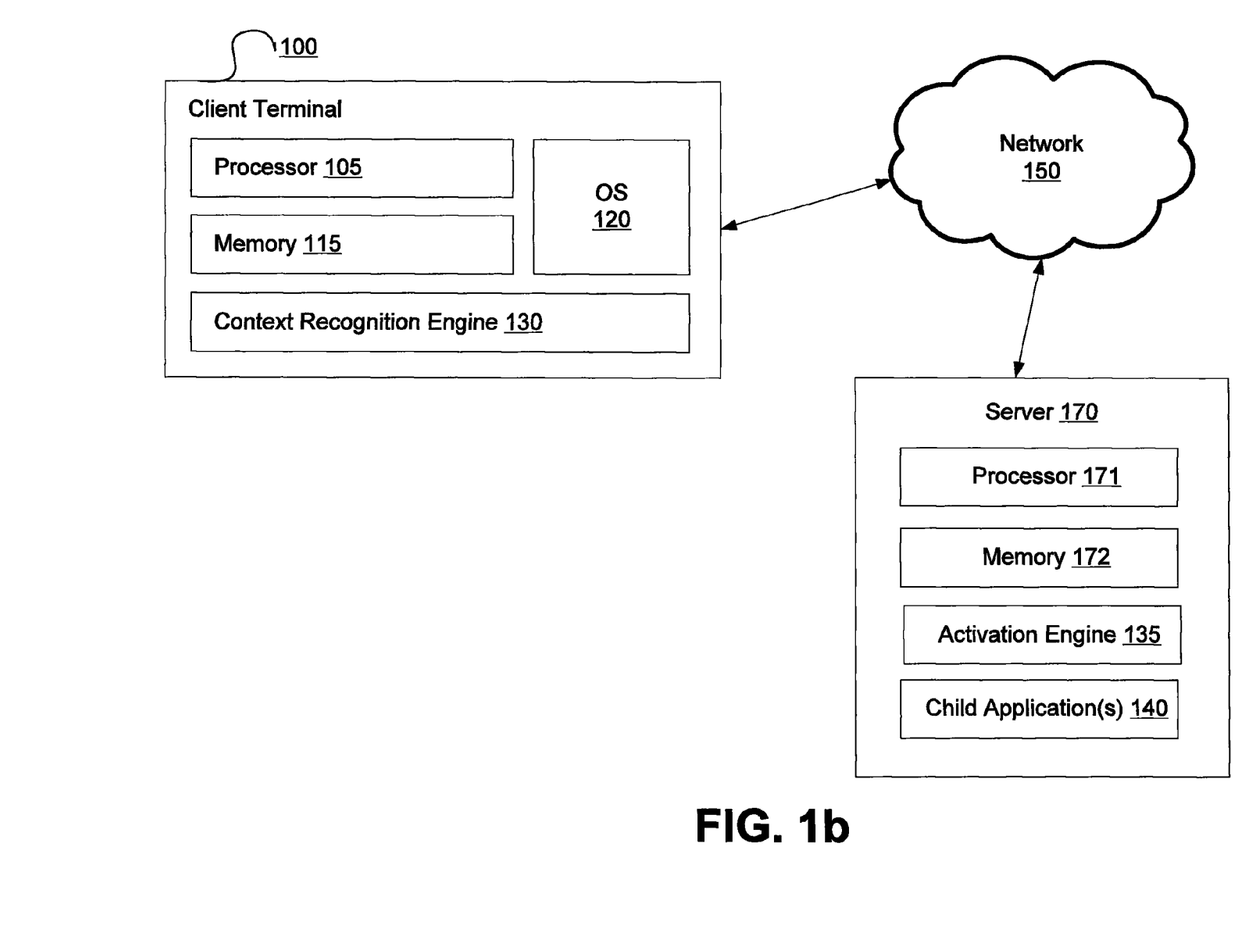

FIGS. 1a and 1b are diagrams of exemplary context recognition and activation system components that may be used to implement disclosed embodiments. The components and arrangement, however, may vary.

In accordance with certain disclosed embodiments, a context recognition engine 130 and activation engine 135 may run on a computer system including a number of components, such as a processor 105, nonvolatile storage 110, memory 115, operating system 120, input/output (I/O) devices 125, and bus 145. In one aspect, a Context Recognition and Activation Engine (CRAE engine 150) may comprise context recognition engine 130 and activation engine 135. CRAE engine 150 may reside in memory 115, and may be loaded from storage 110 or from other external tangible storage medium (not shown) through I/O devices 125. Instructions in CRAE engine 150 may be executed by processor 105. In certain embodiments, as shown in FIG. 1b, CRAE engine 150 may comprise a context recognition engine 130 residing on client terminal 100 and activation engine 135 residing on server 170, which is connected to client computer or terminal 100 over network 150. In other embodiments, CRAE engine 150 may reside on server 170 and client terminal 100 may use a thin client to access CRAE engine 150. In disclosed embodiments activation engine 135 and context recognition engine 130 may be one software file. CRAE engine 150 may work with processor 105 or processor 171 to perform features of disclosed embodiments described below.

In one embodiment, a computer system 100 may implement CRAE engine 150 to perform one or more functions consistent with certain embodiments. Computer system 100 may be a general purpose or notebook computer, a mobile device with computing ability, a server, a mainframe computer, or any combination of these computers and/or affiliated components. Computer system 100 may communicate with network 150 (not shown in FIG. 1*a*) through I/O devices 125. For example, computer system 100 may establish a direct communication link with network 150, such as through a LAN, a WAN, or other suitable connection that enables computer system 100 to send and receive information, as described herein. Computer system 100 may be a standalone system or may be part of a subsystem, which may, in turn, be part of a larger system, such as a networked desktop emulator.

Processors 105 and 171 may be one or more known processing devices, such as a microprocessor from the Pentium™ family manufactured by Intel™ or the Turion™ family manufactured by AMD™. Memory 115 and 172 may be one or more storage devices configured to store information used by processor 105 or 171 to perform certain functions related to disclosed embodiments. Memory 115 may also include instructions that enable a parent application to run on system 100. Alternatively, the instructions that enable a parent application to run on system 100 may be stored in external storage 145 or available from memory 172 over network 150. Storage 110 may be a volatile or non-volatile, magnetic, semiconductor, tape, optical, removable, nonremovable, or other type of storage device or tangible computer-readable medium.

In one embodiment, memory 115 may include one or more context recognition, child application, and/or activation programs or subprograms 130-140 loaded from storage 110 or elsewhere that, when executed by processor 105, perform various procedures, operations, or processes consistent with disclosed embodiments. For example, memory 115 may include context recognition engine 130 that may communicate with operating system 120 to (1) determine and recognize open files, (2) determine and recognize the parent application used to open the files, and (3) determine what child application functions can be performed on the open files. Memory 115 may also include activation engine 135 that assists in the identification of a file that will be the object of a function of a child application, and initiates a call to the child application for the performance of the function on the identified file. Alternatively, memory 172 may include activation engine 135. Memory 115 may also include child applications 140 and an integrative support program that links the other programs and allows them to use a common database, provides a common user interface, performs basic bookkeeping tasks, (such as storing the user's input, etc.), and provides user guidance and help. Memory 115 may also include other programs that perform other functions and processes, such as programs that provide communication support, Internet access, etc. Memory 172 may also include child application 140 and an integrative support program that allow applications in memory 172 to be accessed by system 100.

Methods, systems, and articles of manufacture consistent with disclosed embodiments are not limited to separate programs or computers configured to perform dedicated tasks. For example, memory 115 may be configured with a context recognition engine 130 that performs one or more functions when executed by processor 105. For example, memory 115 may include program 130 that performs one or more functions of the context recognition engine 130. Alternatively, memory 115 may include multiple programs that collectively perform one or more functions of context recognition engine 130. Moreover, processor 105 may execute one or more programs located remotely from system 100. For example, system 100 may access one or more remote programs, such as those found in memory 175, that, when executed, perform functions related to disclosed embodiments.

Memory 115 may be also be configured with operating system 120 that performs known operating system functions when executed by system 100. By way of example, operating system 120 may include Microsoft Windows™, Unix™, Linux™ Apple™ Computers type operating systems, Personal Digital Assistant (PDA) type operating systems, such as Microsoft CE™, or other types of operating systems. Accordingly, embodiments of the disclosed invention will operate and function with computer systems running any type of operating system. In one aspect, operating system 120 may communicate with context recognition engine 130 or activation engine 135 to deliver information about what processes are currently running and what process currently has focus.

I/O devices 125 may comprise one or more input devices and one or more output devices that allow data to be received and/or transmitted by system 100. For example, I/O devices 125 may include one or more input devices, such as a keyboard, touch screen, mouse, and the like, that enable system 100 to receive data from a user, such as selection of a active process, selection of a functionality, selection of one of a plurality of open processes, etc. Further, system 100 may include I/O devices 125 that communicate with one or more output devices, such as a display screen, CRT monitor, LCD monitor, plasma display, printer, speaker devices, and the like, that enable system 100 to present data to a user. I/O devices 125 may also include one or more digital and/or analog communication input/output devices that allow system 100 to communicate with other machines and devices. The configuration and number of input and/or output devices incorporated in I/O devices 125 may vary as appropriate for certain embodiments.

Computer system 100 may also be communicatively connected to one or more databases (not shown) locally or through network 150. The databases store information and are accessed and/or managed through system 100. By way of example, the databases may be document management systems, Microsoft SQL database. SharePoint databases, Oracle™ databases, Sybase™ databases, or other relational databases. The databases may include, for example, data and information related to the API of child applications, such as functions performed by the child applications, parent applications compatible with the functions, parameters required by the functions, etc. Systems and methods of disclosed embodiments, however, are not limited to separate databases or even to the use of a database.

Figure 2:
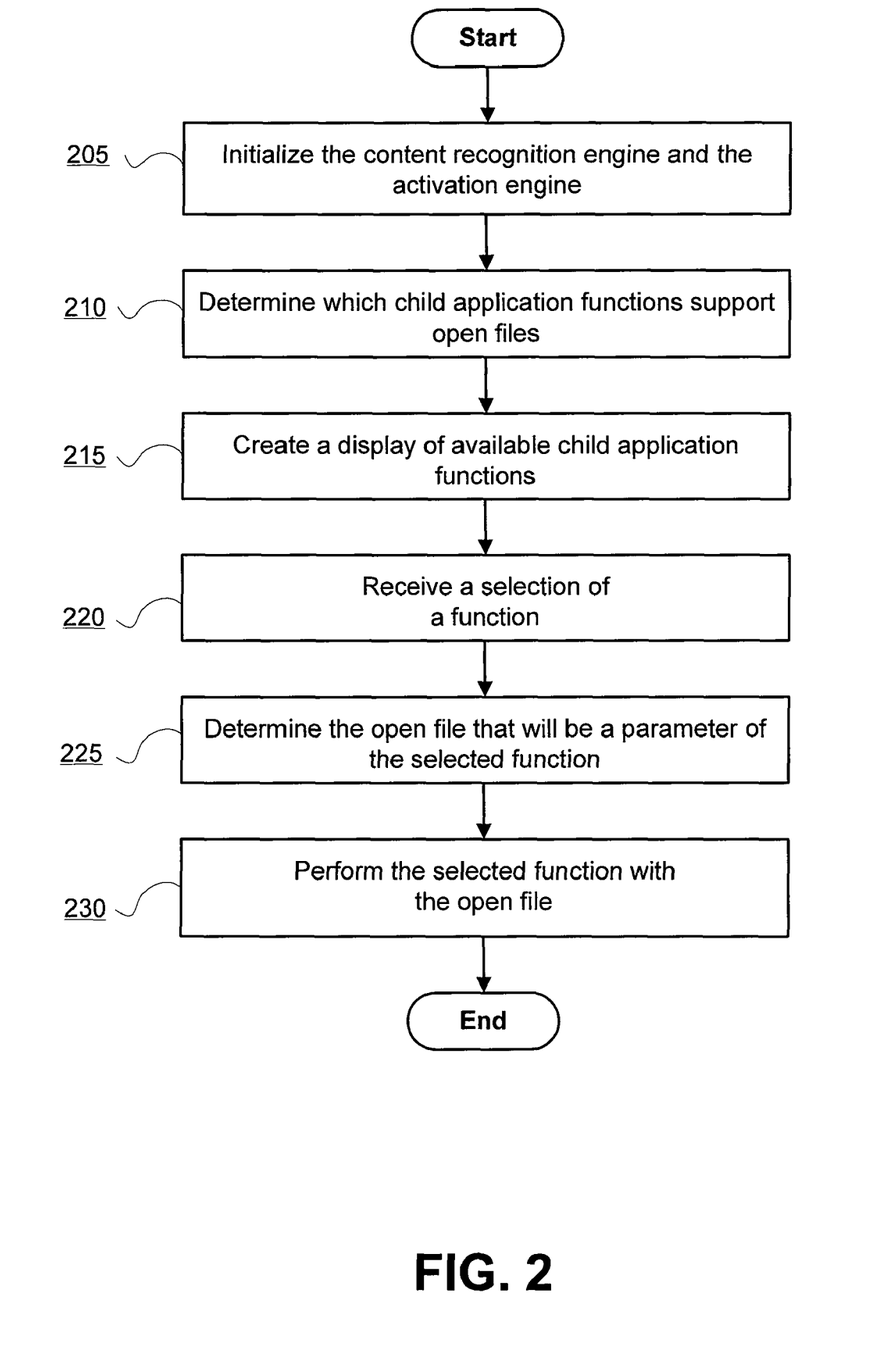
FIG. 2 is a flow diagram illustrating an exemplary context recognition and activation process, consistent with disclosed embodiments.

FIG. 2 is a flow diagram illustrating an exemplary context recognition and activation process, consistent with disclosed embodiments. In certain embodiments, process 200 may be performed by CRAE engine 150. In an embodiment implemented using computer system 100, as shown in step 205 of FIG. 2, processor 105 may initialize context recognition engine 130 and/or activation engine 135. Alternatively, processor 105 may initialize recognition engine 130 and processor 171 may initialize activation engine 135. Once initialized, in step 210, CRAE engine 150 may communicate with operating system 120 to determine the files that are currently open in computer system 100, identify the parent applications that control the open files, and determine one or more available child application functionalities that support the open files. Files include documents, such as text, graphical, image, and other data that may be created by a parent application. For instance, a file may be created and opened with a parent application and may be displayed in its own window on the display device. As explained above, parent applications include word processing programs, spreadsheet programs, picture editors, presentation programs, and document editors. Accordingly, examples of files include, but are not limited to, word processing documents, spreadsheets, diagrams, presentations, JPEG files, BMP files, GIF files, PDF files, and text files. In certain embodiments, CRAE engine 150 may communicate with an operating system (not shown) running on server 170 to determine the files currently open and available to a user on server 170. CRAE engine 150 may determine the parent applications that control the open files on server 170 and determine one or more available child application functionalities that support the open files on server 170.

In step 215, CRAE engine 150 may generate information that is used to present on a display device the child application functions available to system 100. In certain embodiments this may include files available to system 100 through server 170. In one embodiment, CRAE engine 150 generates representations of functions performed by child applications, with functions supporting any open file highlighted. In another embodiment, CRAE engine 150 may generate information for display that may highlight only those functions that support the file currently in focus. A file in focus may be a file that a user is currently working with using the computer system. For example, a file in focus may include a file that is being manipulated or used by a user, such as a file that a user has selected to receive user input. User input may include signals or data representing the selection of a key on the keyboard or a mouse click, or the selection of a shortcut key, such as <Control-V> for "Paste." In this example, when the file has focus, the input is sent to the position of the cursor in the file. As another example, a PDF file may be a file in focus when a user currently manipulates the PDF file using one or more commands, short cuts, or other user-input, such as highlighting text, inserting a watermark, etc. In general, and as another example, a computer system running multiple parent applications may generate interfaces that are displayed collectively on a display device, such as two windows; one window for a PDF document, and a second window for a word processing document. When a user selects the word processing document to perform some operation, such as cut and paste, etc., the word processing document is a file in focus, while the PDF document is not. Alternatively, if the user selects the PDF document (e.g., by placing a cursor in the PDF document window, and thus deselecting the word processing document), the PDF document is a file in focus, while the word processing document is not. The previous examples are illustrative of different types of scenarios to show a file in focus and are not intended to limit the disclosed embodiments. Other types of operations, user inputs, and file selections may be implemented to assign a file in focus that are consistent with certain aspects related to the disclosed embodiments.

In step 220, CRAE engine 150 may receive a selection of a child application function. The selection may be responsive to user input or a processor executing a computer program that provides a selection of the child application. In step 225, CRAE engine 150 may determine the open file that will serve as a parameter of the selected function. In step 230, CRAE engine 150 may launch the child application and perform the selected function on the open file that was passed as a parameter to the function. Launching the child application may involve opening or starting the child application or may involve interacting with an already open instance of the child application. In certain embodiments, launching may involve opening or starting the child application on a server. In this exemplary manner, CRAE engine 150 enables the functionality of a child application to be performed on a file of a parent application without having to be integrated into the parent application and without having a user or computer program independently open the child application to search for the files that the function is performed upon. In certain embodiments, CRAE engine 150 may use DirectX® to launch the child application.

Figure 3:
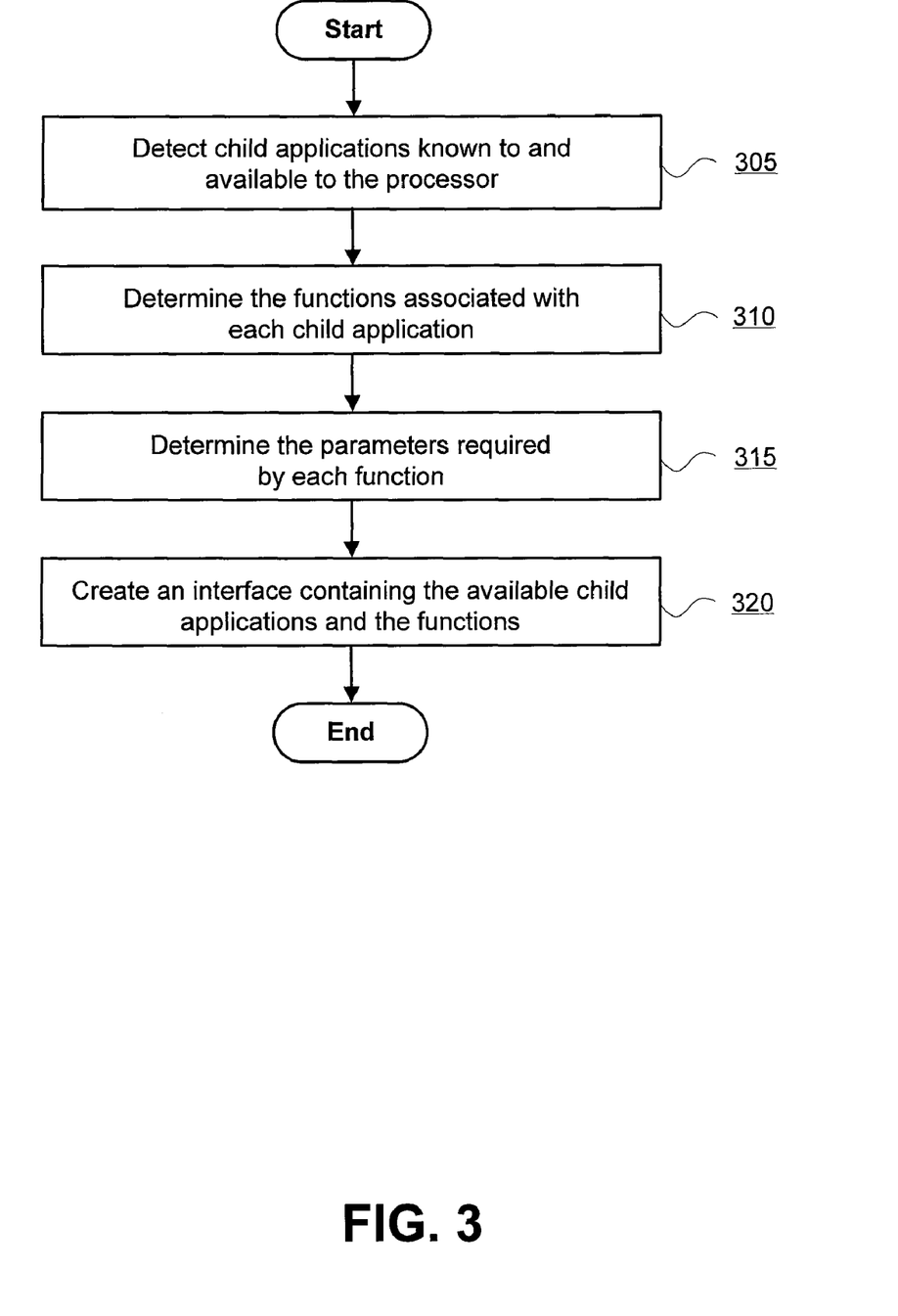
FIG. 3 is a flow diagram illustrating an exemplary initialization of the context recognition and activation system, consistent with disclosed embodiments.

FIG. 3 is a flow diagram illustrating an exemplary initialization of context recognition engine 130 and activation engine 135, consistent with disclosed embodiments. CRAE engine 150 may be programmed to recognize certain child applications. Thus, in step 305 CRAE engine 150 may detect the child applications available to system 100 by communicating with operating system 120. The child applications may be available to system 100 because they are accessible to computer system 100. For example, a child application may be available to computer system 100 because it is (1) installed locally, in memory 115, storage 110, or in external storage 145, (2) it is installed on server 170 and available through network 150, or (3) it is available through a combination of local installation and remote installation on server 170. Child applications may be available to system 100 based on other configurations consistent with the disclosed embodiments.

In step 310, CRAE engine 150 may determine one or more functions associated with each child application available to system 100. The types of functions associated with each child application may vary based on the type of available child application. For example, a meta-data scrubber application may be associated with one or more cleaning functions, such as a single document cleaning function or a multiple document cleaning function. A screen capture child application may include a full screen capture function, a screen region capture function, or a function that captures an area of an open window displayed on a display device. The functions associated with a child application may be stored in a data repository, such as storage 110, external storage 145, or memory 115, as a part of the API for the child application.

Figure 4:
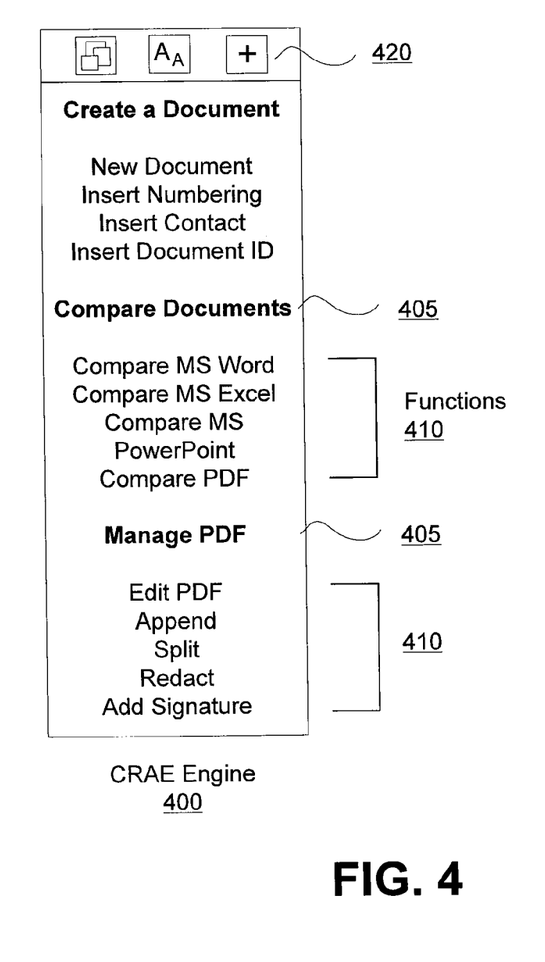
FIG. 4 is an exemplary interface created by a context recognition engine and activation engine, consistent with disclosed embodiments.

In step 315, CRAE engine 150 may determine the parameters required by each determined child application (e.g., what types of files work with a respective function). Once CRAE engine 150 has identified the child applications and the functions associated with each child application, CRAE engine 150 generates in step 320 an interface, such as a display area, that may include the available child applications. FIG. 4 illustrates an exemplary display area listing the available child applications. The processes described in steps 305 through 320 are an example of the initialization of context recognition engine 130 and activation engine 135 described in step 205 of FIG. 2.

FIG. 4 is an exemplary interface created by a context recognition engine and activation engine, consistent with disclosed embodiments. In one embodiment, the interface includes display 400, which may include one or more child application indications 405 that reflect one or more child applications available to system 100. For each child application indication 405, display 400 may include function representation 410 that represents the function(s) supported by the child application represented by indication 405. For example, indication 405 may reflect a document comparison child application and function representation 410 may reflect one or more of the functions supported by the document comparison application, such as the comparison of WORD documents, comparison of EXCEL® documents, or comparison of PDF documents. Function representation 410 may be shown as active or inactive. Function representation 410 may be active when CRAE engine 150 recognizes that the file currently in focus can be passed to the function as a parameter. Display 400 may indicate that function representation 410 is active by using bolding, highlighting, coloring, or some other visual indication. When active, function representation 410 may also be selectable. When function representation 410 is selected, for example, by clicking on the indication with a mouse or by placing the cursor on the indication and pressing the <Enter> key, then the child application associated with the selected function may launch and perform the selected function.

Child application indication 405 may also be selectable. Upon selection, CRAE engine 150 may create a display that enables selection of any open file. In one embodiment, in response to a selection of a specific file, CRAE engine 150 may determine which function of the selected child application indication 405 operates on the selected file, and launch the determined function.

Display 400 may also include settings indicator 420 that may allow a user to customize the settings of a child application and display 400. When settings indicator 420 is selected, CRAE engine 150 may display modifiable child application settings, as shown in FIGS. 5*a* and 5*b*.

Figure 5A:
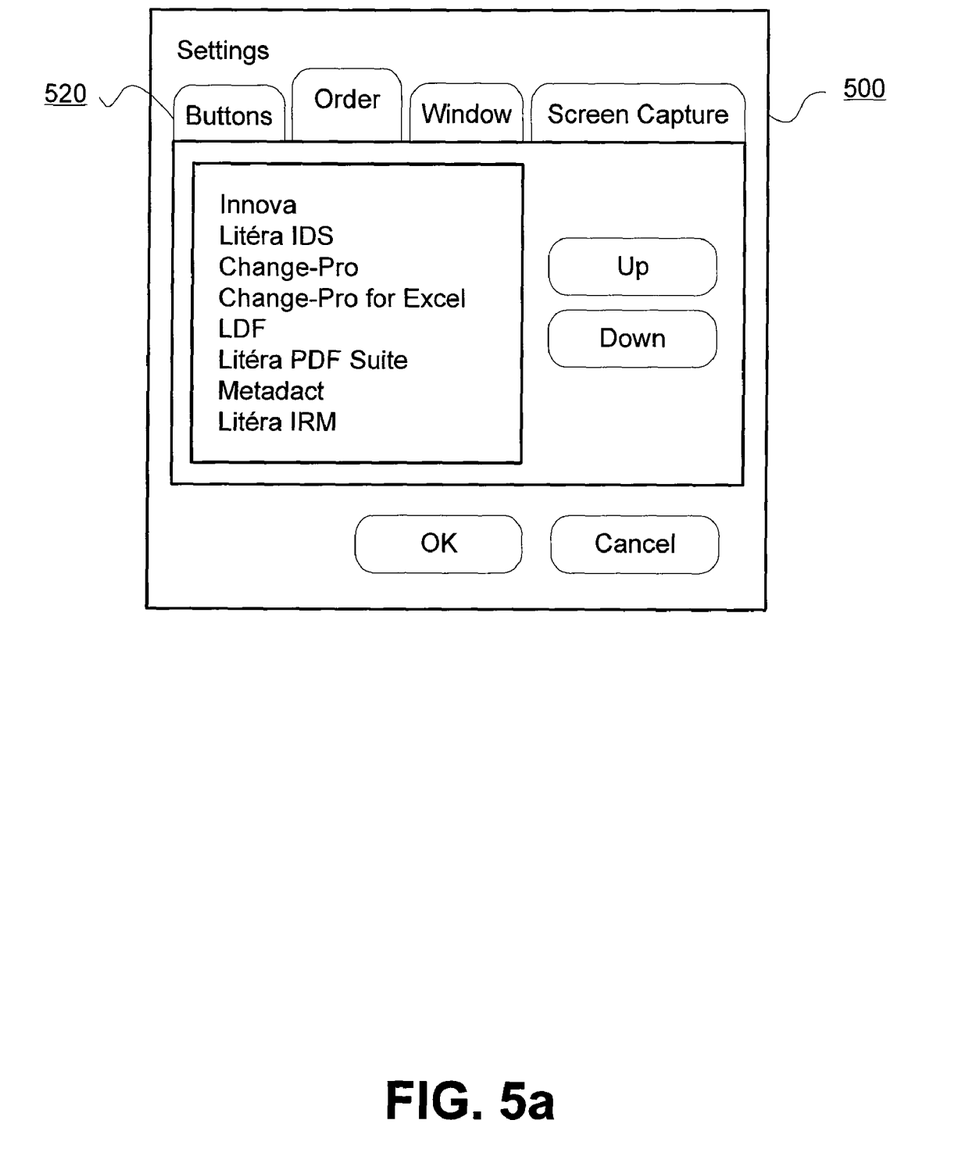
FIGS. 5a and 5b are exemplary child application settings interfaces created by the context recognition and activation system, consistent with disclosed embodiments.
Figure 5B:
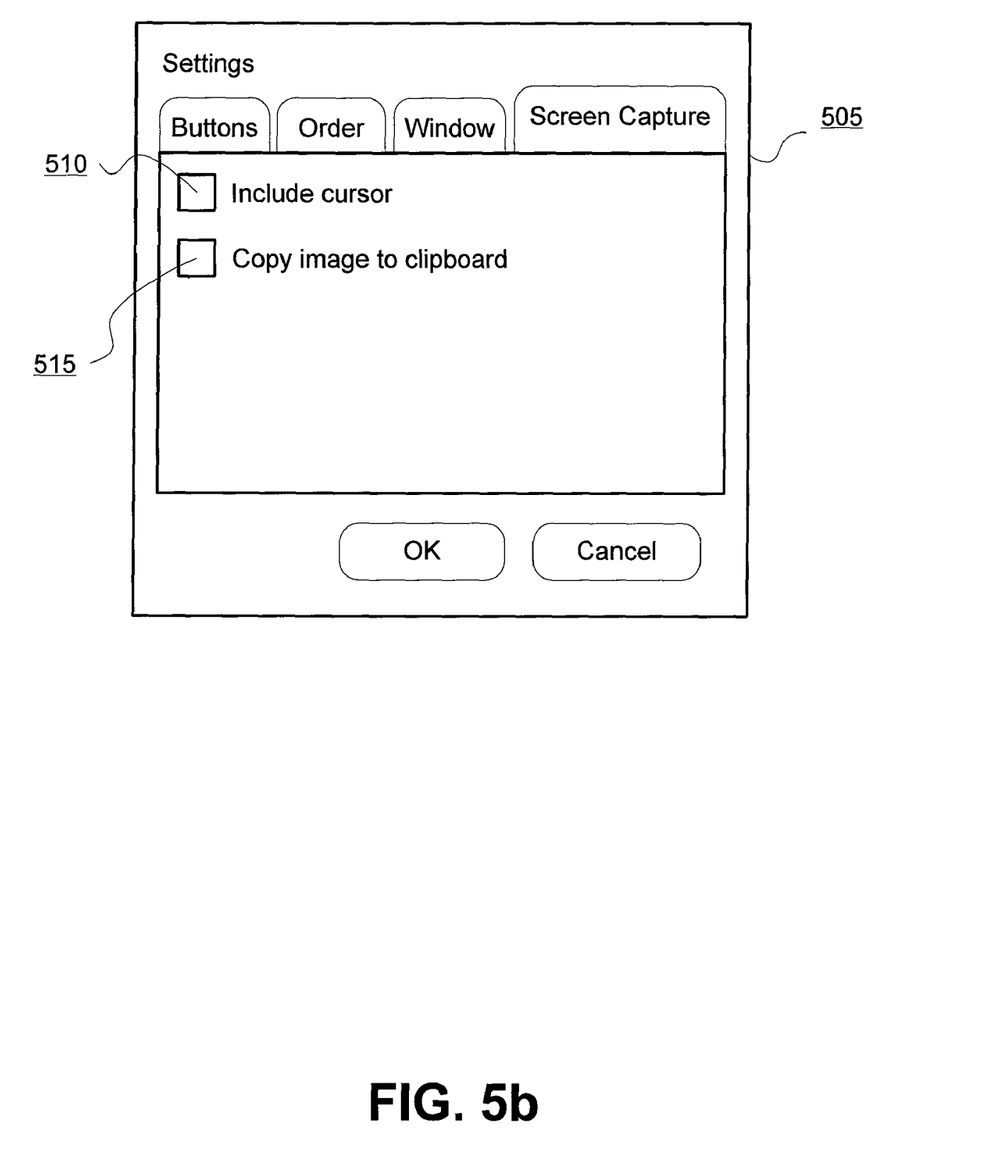

FIGS. 5*a* and 5*b* are exemplary child application settings interfaces created by CRAE engine 150, consistent with disclosed embodiments. In one embodiment, CRAE engine 150 may generate information that is used to display window 500 that provides mechanisms to enable a user to select the order of child application indicators 405, as shown in FIG. 5*a*. In one embodiment, CRAE engine 150 may hide child application indicators 405 from interface 400 based on selection or deselection of the child application in the "Buttons" menu 520. In other embodiments, CRAE engine 150 may display window 505 that enables a user to set parameters for a child application based on selection of items 510-515. Items 510-515 are settings used by a screen capture child application that may be applied to functions performed by the child application. For example, if setting 510 is not selected then the screen capture child application will exclude the cursor from the captured image. In this manner, CRAE engine 150 may receive and set global parameters for a child application that may apply to all functions of the child application. Global parameters are settings of the child application that apply to the functions performed. For example, a global parameter for a document comparison child application may include the color of insertions or the color of deletions. A global parameter for a metadata removal application may be the type of metadata ignored, or left alone, during the metadata removal process. As shown in FIG. 5*b*, a global parameter for a screen capture application may be including the cursor in the captured image. Global parameters may be stored in memory 115, storage 110, external storage 145, or in other storage accessible over network 150.

Figure 6:
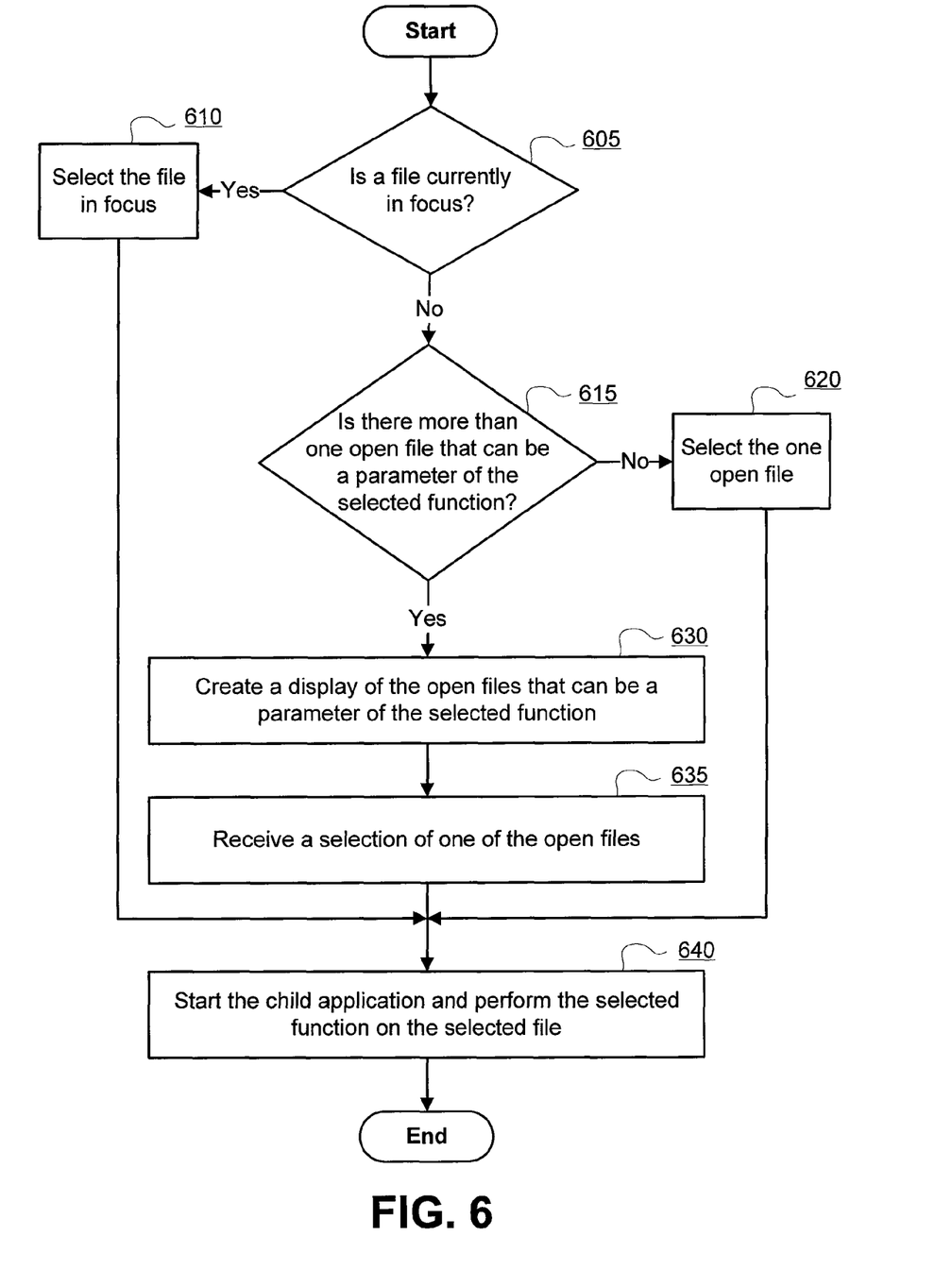
FIG. 6 is a flow diagram illustrating an exemplary activation engine process, consistent with disclosed embodiments.

FIG. 6 is a flow diagram illustrating an exemplary activation engine process, consistent with disclosed embodiments. In one embodiment, the process may be performed by CRAE engine 150. After a child application function has been selected, in step 605 CRAE engine 150 may determine whether an open file currently has focus. If a file is in focus then, in step 610, CRAE engine 150 selects the file currently in focus as an object of the selected function. If no file currently has focus then, in step 615, CRAE engine 150 may determine the number of open files that can be the object of the selected function. In one embodiment, CRAE engine 150 may determine the number of open files that can be the object of a selected function by identifying the parent application of the file in focus. In one embodiment, the determination may be based on the functions of child applications that support files opened by specific parent applications. If only one open file is a candidate for the selected function, then, in step 620, CRAE engine 150 may select the one file as a parameter for the selected function. Once a file has been selected, in step 640, CRAE engine 150 may start the child application and perform the selected function on the selected file. In certain embodiments, CRAE engine 150 may start the child application using DirectX®.

If more than one open file can be a parameter for the selected function, then in step 630, CRAE engine 150 may create a display of the open files able to serve as a parameter for the selected function. In some embodiments this display may resemble the display of FIG. 8. In step 635, CRAE engine 150 may receive a selection of one the documents displayed by step 630. Finally, in step 640, CRAE engine 150 may start the child application and perform the selected function on the selected file.

In one embodiment, a child application function may require two files as parameters of the function. In this case, CRAE engine 150 may select the document in focus as the first parameter (e.g. steps 605-610) and then continue with step 630 to select a second file as the second parameter for the selected function. CRAE engine 150 may repeat this process for as many files as needed by the selected function. The processes described in connection with steps 605 through 640 are an example of determining the open file that will serve as the parameter of the selected function described in step 225 of FIG. 2.

Figure 7:
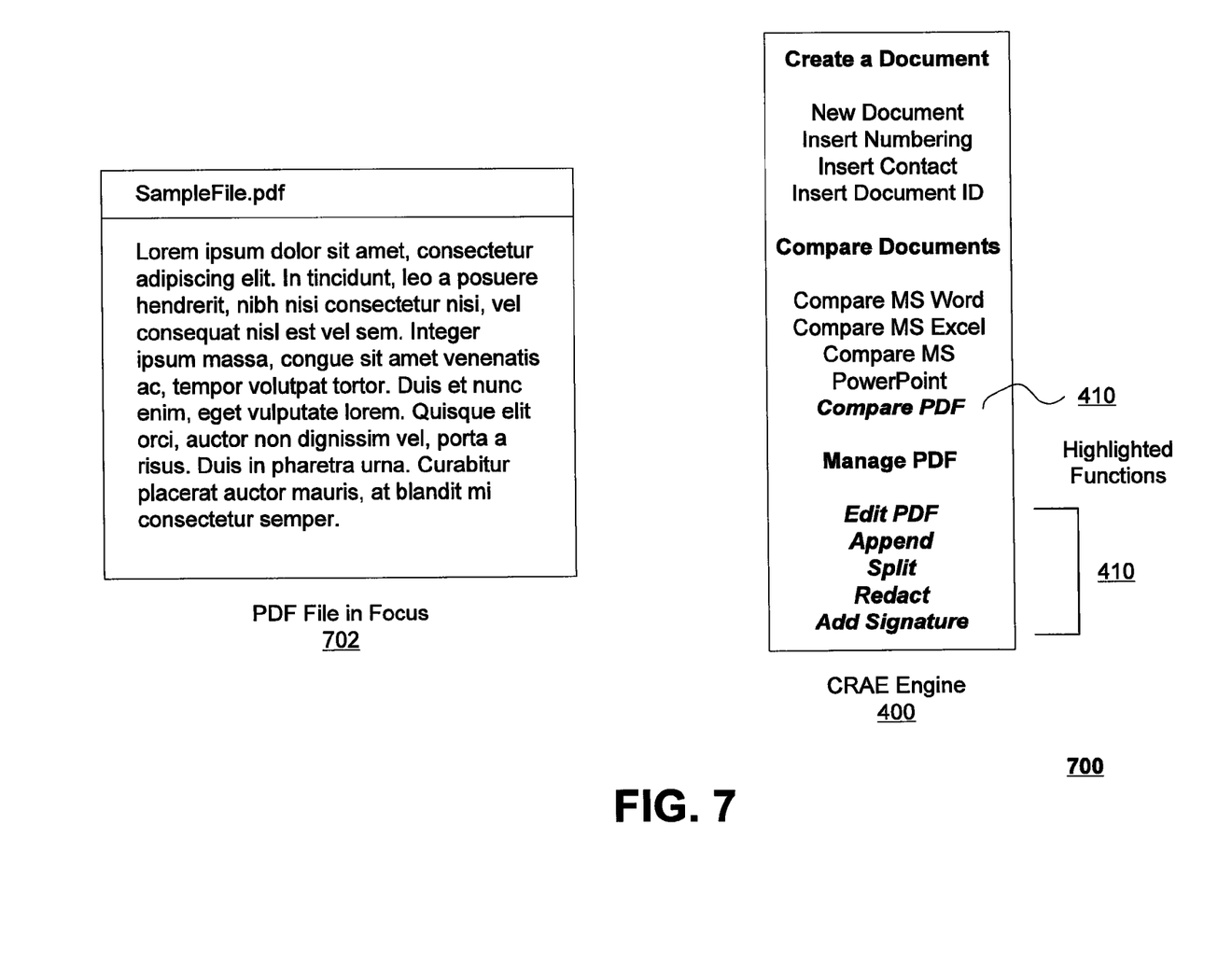
FIG. 7 is an exemplary display of a file in focus and the resulting interface created by a context recognition and activation system of child applications and functions, consistent with disclosed embodiments.

FIG. 7 is an exemplary display of a file in focus and an interface created by a context recognition and activation system of child applications and functions, consistent with disclosed embodiments. In this example, the file in focus is a PDF document, but it is understood that the file could be any type of file consistent with the disclosed embodiments.

Consistent with disclosed embodiments and this example, CRAE engine 150 may recognize the PDF file type and determine the functions that can be performed on a PDF file. As a result, CRAE engine 150 may update certain function representations 410 on display 400 as active. As shown in FIG. 7, the active function representations 410 may be bolded, highlighted, rendered in italics, or have some other visual indicator. In the example of FIG. 7, all of function representations 410 under child application "MANAGE PDF" are active. In addition, function "PDF" is active under child application "COMPARE" and function "SINGLE DOCUMENT" is active under child application "CLEAN METADATA." Thus, in the example of FIG. 7, context recognition system may receive selection of the function REDACT, start the MANAGE PDF child application with the REDACT function, and use the PDF document in focus as the parameter of the REDACT function.

Figure 8:
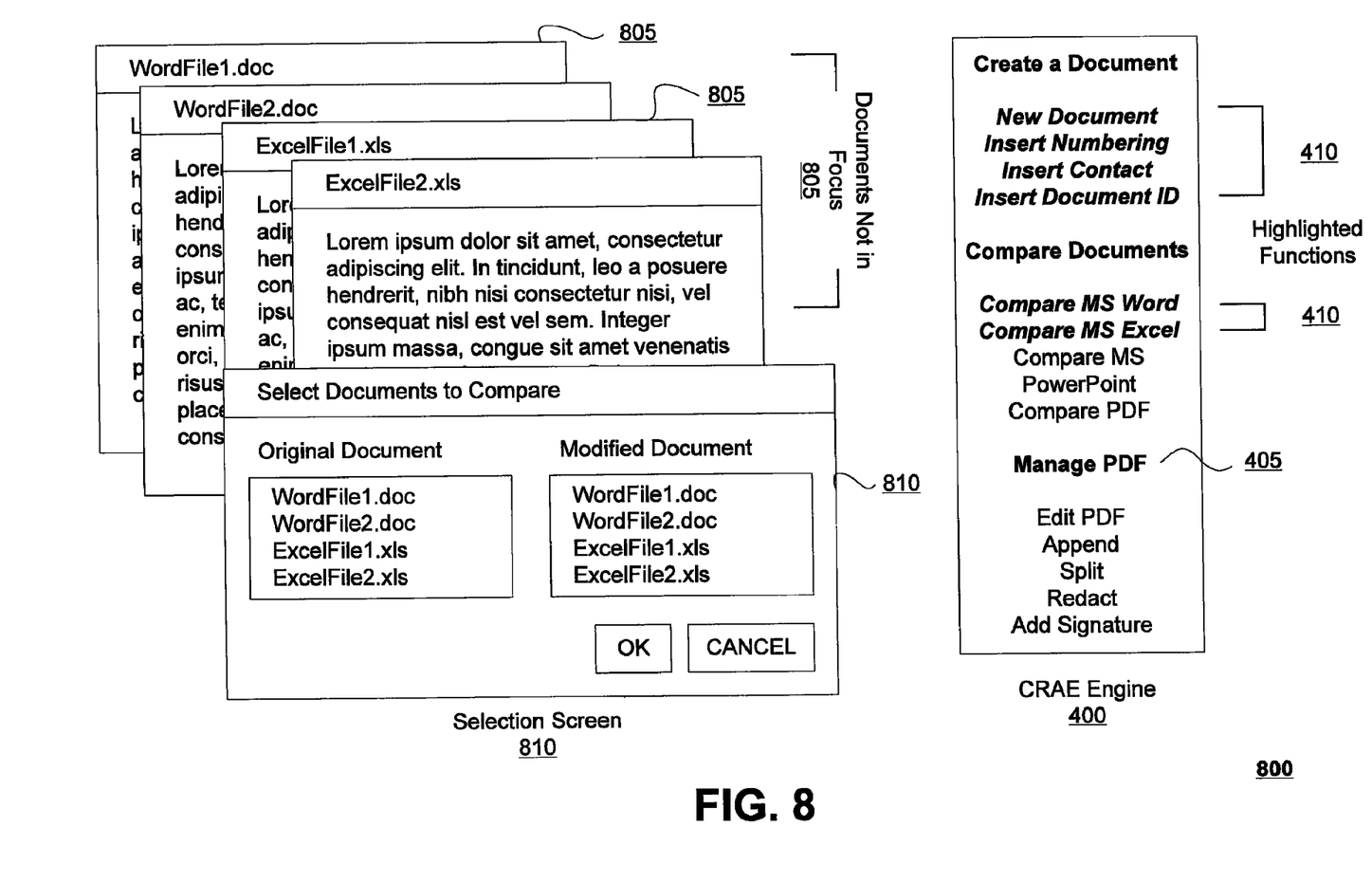
FIG. 8 is an exemplary display of selection of one of a plurality of open files for use as the parameter of a function of a child application, consistent with disclosed embodiments.

FIG. 8 is an exemplary display of selection of one of a plurality of open files for use as the parameter of a function of a child application, consistent with disclosed embodiments. Consistent with the example shown in FIG. 8, CRAE engine 150 may determine that no files are in focus and thus determine the child application functions that can be performed on any currently open files 805. As a result, CRAE engine 150 may render certain function representations 410 on display 400 as active. In the example of FIG. 8, WORD and EXCEL® documents are open, so CRAE engine 150 makes the "WORD" and "EXCEL" functions of child application "COMPARE" active. In addition, CRAE engine 150 may also make the "SINGLE DOCUMENT" and "BATCH CLEAN" functions of child application "CLEAN METADATA" active because these functions can be performed on WORD and EXCEL® documents.

Once CRAE engine 150 receives a selection of one of the function representations 410, it may create an interface, such as window 810, that allows selection of one or more of the open documents. In the example of FIG. 8, the COMPARE function requires two files, so window 810 allows selection of two of the open documents. In other embodiments, window 810 may allow selection of one file, or it may allow selection of three or more files. The number of files selectable from window 810 may depend on the number of files a selected function requires as parameters. In the example of FIG. 8, after both files have been selected, CRAE engine 150 may start the child application associated with the selected function, causing the child application to perform the selected function on the two selected files.

The foregoing descriptions have been presented for purposes of illustration and description. They are not exhaustive and do not limit the disclosed embodiments to the precise form disclosed. Modifications and variations are possible in light of the above teachings or may be acquired from practicing the disclosed embodiments. For example, the described implementation includes software, but the disclosed embodiments may be implemented as a combination of hardware and software or in hardware alone. Additionally, although disclosed aspects are described as being stored in a memory on a computer, one skilled in the art will appreciate that these aspects can also be stored on other types of tangible computer-readable media, such as secondary storage devices, like hard disks, floppy disks, a CD-ROM, or other forms of RAM or ROM.

Computer programs based on the written description and disclosed methods are within the capabilities of one of ordinary skill in the art. The various programs or program modules can be created using any of the techniques known to one skilled in the art or can be designed in connection with existing software. For example, program sections or program modules can be designed in or by means of DirectX, .Net Framework, .Net Compact Framework (and related languages, such as Visual Basic, C, etc.), XML, Java, C++, JavaScript, HTML, HTML/AJAX, or any other now known or later created programming language. One or more of such software sections or modules can be integrated into a computer system or existing browser software.

Other embodiments will be apparent to those skilled in the art from consideration of the specification and practice of the embodiments disclosed herein. The recitations in the claims are to be interpreted broadly based on the language employed in the claims and not limited to examples described in the present specification or during the prosecution of the application, which examples are to be construed non-exclusive. Further, the steps of the disclosed methods may be modified in any manner, including by reordering steps and/or inserting or deleting steps. It is intended, therefore, that the specification and examples be considered as exemplary only, with a true scope and spirit being indicated by the following claims and their full scope equivalents.

What is claimed is:

1. A computer-implemented method for launching a child application, the method comprising:
   detecting a child application available to a processor of a computer;
   performing, by the processor, the operations of
      determining a function associated with the child application;
      determining one or more parameters used to perform the function of the child application;
      generating information used to display a representation of the function in an interface that is separate from a parent application, so that the representation of the function is selectable; and
      in response to selection of the representation of the function, launching the child application and performing the function such that the function of the child application is performed without requiring integrating the child application into the parent application.

2. The method of claim 1, the operations further comprising:
   receiving a selection of the representation of the function;
   determining that an open file has focus; and
   launching the child application to perform the function of the child application on the open file.

3. The method of claim 2, further comprising:
   receiving a global parameter for the child application; and
   performing the function of the child application on the open file using the global parameter.

4. The method of claim 2, wherein a server receives the selection of the representation of the function and launches the child application to perform the function on the open file.

5. The method of claim 1, wherein the interface includes information that identifies the child application associated with the function.

6. The method of claim 5, further comprising:
   receiving a request to hide the child application and the function from the interface; and
   generating information used to display the interface, wherein the representation of the function is not part of the information generated.

7. The method of claim 1, wherein the generating further comprises:
   identifying a parent application of a file currently in focus; and
   determining that the function may operate on the file currently in focus, wherein the representation of the function indicates the function is active.

8. A system for launching a child application, the system comprising:
   a processor; and
   a memory coupled to the processor, the memory storing instructions to direct the processor to perform operations comprising:
      detecting a child application available to the processor of a computer,
      determining a function associated with the child application,
      determining one or more parameters used to perform the function of the child application,
      generating information used to display a representation of the function in an interface that is separate from a parent application, so that the representation of the function is selectable, and
      in response to selection of the representation of the function, launching the child application and performing the function such that the function of the child application is performed without requiring integrating the child application into the parent application.

9. The system of claim 8, the operations further comprising:
   receiving a selection of the representation of the function;
   determining that an open file has focus; and
   launching the child application to perform the function of the child application on the open file.

10. The system of claim 9, the operations further comprising:
    receiving a global parameter for the child application; and
    performing the function of the child application on the open file using the global parameter.

11. The system of claim 9, wherein a server receives the selection of the representation of the function and launches the child application to perform the function on the open file.

12. The system of claim 8, wherein the interface includes information that identifies the child application associated with the function.

13. The system of claim 12, the operations further comprising:
receiving a request to hide the child application and the function from the interface; and
generating information used to display the interface, wherein the representation of the function is not part of the information.

14. The system of claim 8, wherein the generating further comprises:
identifying a parent application of a file currently in focus; and
determining that the function may operate on the file currently in focus, wherein the representation of the function indicates the function is active.

15. A computer-implemented method for launching a child application, the method comprising:
detecting a child application available to a processor of a computer; and
performing, by the processor, the operations of:
determining a function associated with the child application,
determining one or more parameters used to perform the function of the child application,
determining that a plurality of open files may be the object of the function, and
generating information used to display a representation of the function in an interface that is separate from a parent application, so that the representation of the function is selectable and launches the child application upon selection without requiring integrating the child application into the parent application.

16. The method of claim 15, further comprising:
receiving a selection of the function;
determining that one of the plurality of open files has focus; and
launching the child application to perform the function of the child application on the one of the plurality of open files that has focus.

17. The method of claim 15, further comprising:
receiving a selection of the function;
determining that none of the plurality of open files has focus;
generating information used to enable selection of one of the plurality of open files;
receiving a selection of one of the plurality of open files; and
launching the child application to perform the function on the one of the plurality of open files.

18. The method of claim 17, wherein the launching further comprises sending the selection of the one of the plurality of open files and the selection of the function to a server, wherein the server launches the child application to perform the function on the one of the plurality of open files.

19. A system for launching a child application, the system comprising:
a processor; and
a memory coupled to the processor, the memory storing instructions to direct the processor to perform operations comprising:
detecting a child application available to a processor of a computer;
determining a function associated with the child application,
determining one or more parameters used to perform the function of the child application,
determining that a plurality of open files may be the object of the function, and
generating information used to display a representation of the function in an interface that is separate from a parent application, so that the representation of the function is selectable and launches the child application upon selection without requiring integrating the child application into the parent application.

20. The method of claim 19, the operations further comprising:
receiving a selection of the function;
determining that one of the plurality of open files has focus; and
launching the child application to perform the function of the child application on the one of the plurality of open files that has focus.

21. The system of claim 19, the operations further comprising:
receiving a selection of the function;
determining that none of the plurality of open files has focus;
generating information used to enable selection of one of the plurality of open files;
receiving a selection of one of the plurality of open files; and
launching the child application to perform the function on the one of the plurality of open files.

22. The system of claim 21, wherein the launching further comprises sending the selection of the one of the plurality of open files and the selection of the function to a server, wherein the server launches the child application to perform the function on the one of the plurality of open files.

23. A computer-implemented method for launching a child application, the method comprising:
performing, by the processor, the operations of
generating information used to display a representation of a plurality of functions available in a child application, so that the plurality of functions are selectable;
recognizing an open file created by the parent application;
determining that the one of the plurality of functions can be performed on the open file;
allowing selection of a representation of the one of the plurality of functions,
receiving a selection of the representation of the one of the plurality of functions, and
in response to receiving the selection, launching the child application to perform the one of the plurality of functions on the open file without requiring integrating the child application into the parent application.

24. The method of claim 23, wherein the launching further comprises sending the selection of the one of the plurality of functions to a server, wherein the server launches the child application to perform the function on the open file.

25. A system for launching a child application, the system comprising:
a processor; and
a memory coupled to the processor, the memory storing instructions to direct the processor to perform operations comprising:
generating information used to display a plurality of representations of a plurality of functions available in a child application, so that the plurality of representations are selectable, recognizing an open file created by the parent application;

determining that the one of the plurality of functions can be performed on the open file, allowing selection of a representation of the one of the plurality of functions, receiving a selection of the representation of the one of the plurality of functions, and in response to receiving the selection, launching the child application to perform the one of the plurality of functions on the open file without requiring integrating the child application into the parent application.

26. The system of claim 25, wherein the launching further comprises sending the selection of the one of the plurality of functions to a server, wherein the server launches the child application to perform the function on the open file.

* * * * *